UNITED STATES PATENT OFFICE.

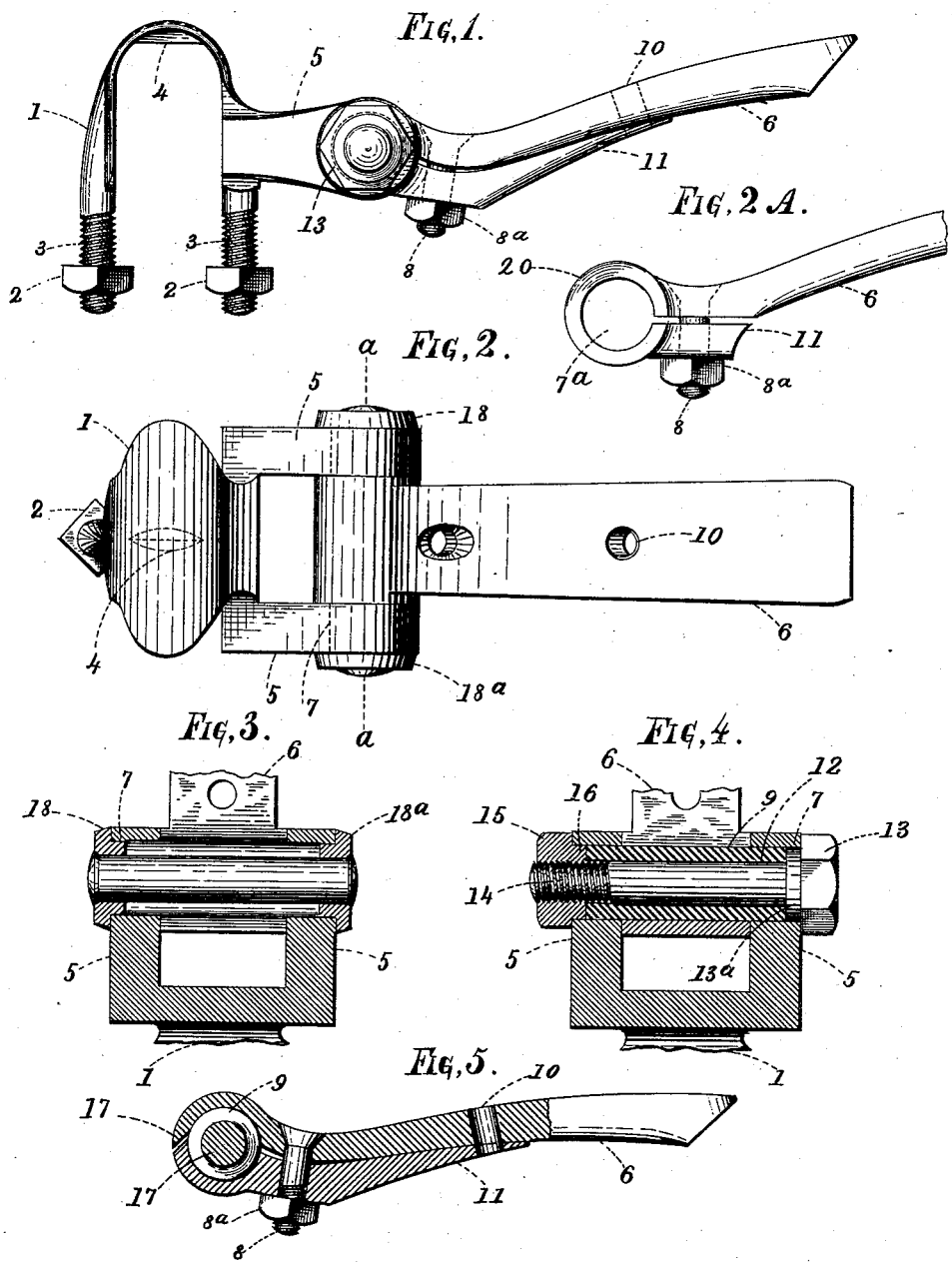

PETER BROADBOOKS, OF BATAVIA, NEW YORK.

THILL-COUPLING.

SPECIFICATION forming part of Letters Patent No. 484,566, dated October 18, 1892.

Application filed January 20, 1892. Serial No. 418,637. (No model.)

*To all whom it may concern:*

Be it known that I, PETER BROADBOOKS, a citizen of the United States, residing at Batavia, in the county of Genesee and State of New York, have invented certain new and useful Improvements in Thill-Couplings, of which the following is a specification.

My invention relates to certain improvements in thill-couplings whereby a longer bearing is provided, the coupling-joint is not so liable to be filled with dust, and consequently will wear a long time without getting loose and rattling, and whereby other advantages are obtained, all of which will be fully and clearly hereinafter described and claimed, reference being had to the accompanying drawings, in which—

Figure 1 is a side elevation of the coupling complete. Fig. 2 is a top view. Fig. 2$^A$ is a detached side elevation of the shaft-iron. Fig. 3 is a cross-section in or about line $a\ a$, Fig. 2, cutting through the draw-clip and shaft-iron only, showing a slight modification of the device, the bearing-sleeve being omitted. Fig. 4 is a similar section cutting through the draw-clip, the shaft-iron, and the sleeve. Fig. 5 is a sectional elevation showing a modification of the shaft-iron, the section being a longitudinal section through a portion of the draw-iron, cutting, also, through the draw-bolt and showing an end view of the sleeve through which the draw-bolt passes.

Referring to the drawings, the draw-clip 1 is provided with the well-known nuts 2 and screw portion 3, by which it is secured to the axle. On the upper inner side of the clip I form a narrow ridge 4 (shown in Fig. 1 and by dotted lines in Fig. 2) to keep the clip from sliding upon the axle-bed. It is preferably formed in one piece with the clip. At one side of the clip are the usual projecting portions or clip-ears 5, between which the shaft-iron 6 is secured, each of which is provided with a hole 7, (see Figs. 2, 3, and 4; shown by dotted lines in Fig. 2,) and each directly in line with the other and of the same size as the hole 7$^a$ in the draw-iron 6. (See Fig. 2$^A$.)

The shaft-iron 6 is constructed, preferably, in one piece, substantially as shown in Fig. 2$^A$; but it may be made in two parts, as shown in Figs. 1 and 5. It is provided with a screw bolt and nut 8 8$^a$ for the purpose of drawing it tightly together, and thereby rigidly clasp and hold the sleeve or tubular journal 9 so that it cannot turn or move within it. If desired, there may be more than one bolt for rigidly holding the tubular journal 9. (See Figs. 1, 2, and 5, where a second hole is shown at 10 to receive another bolt, the lower portion 11 of the shaft-iron being made longer to receive it.)

12 in Fig. 4 represents the bolt that passes through the tubular journal. It is provided with a head 13, having a reduced portion 13$^a$, adapted to fit tightly in the holes 7, (see Fig. 4,) so as to exclude the dust from passing in that way. At the opposite end of the bolt 12 is the usual screw portion 14 and a screw-nut 15, provided with a reduced portion 16, adapted to fit tightly in the opposite hole 7 and rigidly connect the bolt with the clip-ears, making it stationary therewith. This coupling is put together by putting the shaft-iron in place, so that the holes 7 and 7$^a$ will be in line. Then the sleeve or tubular journal is put in and the bolt 12 is passed through the sleeve and secured by the nuts 13 and 15, above mentioned. The draw-iron is then secured rigidly to the tubular journal 9 by means of the screw bolt and nut 8 8$^a$.

It will be noticed that the tubular journal 9 is long enough to project into the holes 7, so that its ends rest against the reduced portions 13$^a$ and 16, and is fitted closely but so as to turn easily therein and on the bolt 12, while at the same time it is rigidly held to and made stationary with the draw-iron, so as to be turned by it. From this construction it will be seen that an unusually-long bearing is provided for, as the ends of the tubular bearing project into the clip-ears 5 until they rest against the reduced portions 13$^a$ and 16, as hereinbefore mentioned, so that the wearing-surface extends nearly the whole length of the bolt 12, upon which the tubular bearing turns, as it is rigidly secured to the shaft-iron, so as to turn or move with it. This construction also keeps the bolt 12 free from dust or dirt, so that it will wear a long time without getting loose or rattling. Furthermore, all lateral play of the shaft-iron is avoided. I not only give a longer bearing, but the tube may be made of hardened metal, thereby giving the greatest amount of bearing and wearing surface upon the bolt, which is so essential in providing a strong, safe, and durable thill-coupling.

In the modification (see Fig. 5) I have made the shaft-iron parts 6 and 11 separate at the ends 17, so as to be in two parts. One advantage of this construction is that the bolt 12 may be slipped into the heads 18 and 18ª and riveted, substantially as shown in Fig. 3. By this construction the draw-iron is made easily removable by removing the nut 8ª; but I do not think it would clamp and hold the tubular bearing as rigidly to the draw-iron as the clamping end 20 or the construction shown in Fig. 2ª would, although it answers the purpose very well.

It will be noticed that when the tubular bearing is in its place in the ears of the draw-clip and rigidly and immovably secured to the shaft-iron, as above described, it cannot come out of place, and would alone of itself, without bolt or nut, answer for a thill-coupling; but it would not have the lasting qualities of an extended bearing-surface.

I am aware that tubular bearings have heretofore been used in thill-couplings, and therefore do not claim such construction broadly but What I do claim is—

1. In a thill-coupling, the combination, with a draw-clip provided with ears having openings directly opposite and in a line with each other, of a tubular journal having its ends extend into said openings, a bolt adapted to pass through the tubular journal, provided with a head having a reduced portion adapted to fit closely in the outer side of the opening in the clip-ear and a nut at its opposite end having a reduced portion adapted to fit tightly in the outer side of the opposite clip-ear, so as to rigidly connect the bolt with the clip-ears and closely inclose the tubular bearing, and a means, substantially as above described, for rigidly securing the shaft-iron to the tubular bearing, whereby a long dust-proof bearing is secured on the bolt, for the purposes described.

2. In a thill-coupling, the combination, with a draw-clip, of a tubular bearing having its ends extend into the opening in the clip-ears, a shaft-iron rigidly and immovably secured between the clip-ears to the tubular bearing, a bolt adapted to pass through the tubular bearing, and a means, substantially as above described, for securing the ends of the bolt to the clip-ears, for the purposes described.

PETER BROADBOOKS.

Witnesses:
J. M. CALDWELL,
JAMES SANGSTER.